Patented Dec. 4, 1928.

1,694,124

UNITED STATES PATENT OFFICE.

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE.

PURIFICATION OF BENZOIC ACID AND ITS DERIVATIVES.

No Drawing. Application filed October 17, 1927. Serial No. 226,820.

This invention relates to methods of purifying benzoic acid and its derivatives and homologues.

When benzoic acid or its derivatives are prepared from the corresponding phthalic anhydrides, or by a single operation from naphthalene, it is frequently contaminated with greater or less amounts of phthalic acid, depending on the processes used. Similarly, substituted benzoic acids prepared by analogous processes are contaminated by the corresponding substituted phthalic acids. The separation of these two products presents some difficulty when straight sublimation is used, as phthalic acid is transformed into phthalic anhydride which is relatively volatile, and sharp separation presents considerable difficulty.

According to the present invention, a mixture of benzoic acid and phthalic acids or their derivatives are subjected to a sublimation in the presence of vapors of organic solvents for benzoic acid. Examples of such solvents are benzol, toluol, solvent naphtha, chloroform, carbon tetrachloride, ether, paraffin hydrocarbons and other well known organic solvents of similar characteristics. All of these solvents dissolve benzoic acid with greater or less facility and also dissolve substituted benzoic acids or homologues of benzoic acid. They, however, possess little or no solvent power for phthalic acid particularly in the presence of some water. When vapors of solvents for benzoic acid, superheated if necessary, are passed through a mixture of benzoic and phthalic acids, with or without excess water, the mixture being suitably heated to temperatures below 191° C., the benzoic acid is sublimed substantially entirely free from phthalic acid. It is possible of course to use temperatures above 191° C., but at such temperatures phthalic acid is transformed into phthalic anhydride which is very readily sublimed and the separation is less readily obtained and less perfect at temperatures above 191° C., but the invention in its broader aspects is not strictly limited to the use of temperatures below this point, as temperatures slightly above 191° C. are practically usable, though for many purposes not as advantageous as the lower temperatures. The dividing line between the existence of the phthalic anhydride and phthalic acid occurs of course at slightly different temperatures, when substituted phthalic anhydrides or acids are in question, and in such cases of course it is preferable to maintain the sublimation below the critical temperature at which the transformation of the acid to the anhydride takes place.

The solvent vapors may be introduced in the form of saturated or superheated vapors into a hot mixture of benzoic and phthalic acids in the presence or absence of water, and may of course supply the heat for maintaining the temperature of the mixture, or the solvent may be mixed with the benzoic and phthalic acids and the vapors formed by heating the mixture. This latter procedure results in satisfactory separation, but is of course in the nature of a discontinuous or batch process, and the introduction of the solvents in the form of vapors presents many advantages, as it permits a continuous process, the phthalic acids being suitably removed after removal of the benzoic acids. Such a continuous process can for example be carried out by passing a hot mixture of benzoic and phthalic acids in countercurrent to a stream of hot saturated or superheated vapors of organic solvents. Such a continuous process is very desirable in many cases, as it permits a marked reduction in operating costs. However, where a preliminary incomplete separation of the benzoic acids and phthalic acids is effected by means of a solvent, the solution of benzoic acid and solvent, with or without further additions of crude material, may be used as described above, and for certain purposes this discontinuous or batch process is therefore of importance, and is included in the scope of the present invention.

The problem of separating benzoic acids from superheated vapors of the organic solvents with which they are sublimed is relatively simple, as the benzoic acids condense at temperatures considerably above the boiling point of most of the organic solvents used. It is therefore necessary only to cool the gas stream to a point sufficiently low to condense out benzoic acids. The remaining gases, which are composed primarily of the organic solvent, and which may contain water, if the original benzoic acid-phthalic acid mixture contained excess water, may then be freed from water if desired by any suitable means, such as for example by cooling and separation of the liquids, or in some cases the presence of the water may be harmless, and the gases may be recirculated through the benzoic acid-phthalic acid mixture if necessary with suitable heating. This circulatory process is of great advantage practically, and constitutes the preferred embodiment of the present invention. It has the advantage that where any benzoic acid still remains in vapor form this is not lost but is again sublimed with fresh amounts of benzoic acid. Of course where the water is taken out of the gaseous stream, some remaining benzoic acid may come down in solution in the water, and can be recovered by any suitable means.

Where a continuous process is not desired it is also possible, though for some purposes less desirable, to condense the entire organic solvent benzoic acid vapors and then distill off the solvent.

Where it is not desired to remove water from the benzoic acid-phthalic acid mixture it is advantageous to use low boiling solvents, such as ether or carbon tetrachloride, or similar solvents. On the other hand, however, the use of ether increases the fire danger. The particular solvent to be chosen will therefore depend to a large extent on the nature of the benzoic acid-phthalic acid mixture and on the apparatus used, and the best solvent for any particular case will be chosen by the skilled chemical engineer in accordance with the principles described above.

When phthalic anhydride or its substitutes is transformed into benzoic acid catalytically, by splitting off carbondioxide, as is described in my co-pending application, Serial No. 223,845, filed October 3, 1927, the vapor mixture containing benzoic acid, phthalic acid and water, or small amounts of phthalic anhydride, may be treated directly with vapors of organic solvents which are sufficiently cooled to bring the temperature of the gaseous mixture down below 191° C. for unsubstituted benzoic acids. Under such conditions most of the phthalic acid precipitates down, but the benzoic acid remains in vapor form, and is thereby separated. This process has the advantage that it is continuous and that it utilizes the heat of the catalytic conversion to effect the separation. Obviously of course instead of introducing vapors of organic solvents they may be sprayed in liquid form into the gaseous stream, where the amount of solvent used is not sufficiently great or does not possess a sufficiently high latent heat of evaporation to reduce the temperatures of the gas stream to too low a point. Naturally of course the solvent may be added partly in the form of vapor and partly in the form of finely divided liquid, as will be clear to the skilled chemist.

Benzoic acid may be produced from phthalic anhydride by a catalytic reaction in a reducing atmosphere as described in my co-pending application, Serial No. 287,901 filed June 23, 1928, and in such a case the mixture coming over may contain benzoic acid, benzaldehyde, some phthalic anhydride, and in some cases some benzyl alcohol. This mixture may be condensed and treated as described above, or the gaseous stream may be immediately treated with organic solvent in the liquid or vapor form, as described in the foregoing paragraph. As benzaldehyde and any benzyl alcohol which may be present are more volatile than benzoic acid, they will of course be removed with it, and may be separated by any suitable means, such as for example by fractional condensation from the gaseous stream, by reaction with chemical reagents, by solution in solvents, or by any other suitable method.

It is obvious of course that instead of using one organic solvent a plurality may be used, wherever such procedure is desirable, and where a continuous vapor phase process is used, as when the vapors from the catalytic splitting of phthalic anhydride are treated it will be clear that one or more solvents may be introduced in the vapor or in the liquid form, or one solvent may be introduced partly in one form and partly in the other, depending on the exigencies of the particular installation.

The invention will be described in greater detail in connection with the following specific examples:

Example 1.

A mixture containing benzoic acid and phthalic acid in the proportion of approximately 85 per cent benzoic and 15 per cent phthalic acid and containing a small amount of water is heated to a temperature between 125 and 150° C., and vapors of benzol heated to approximately the same temperature are bubbled through the mixture. The benzoic acid is substantially completely removed, together with some water, and the benzol vapors are cooled to a temperature a little above the boiling point of the azeotropic mixture of benzol and water and above the boiling point of benzol. Benzoic acid condenses out, while the benzol vapors pass on, and can be condensed and re-used after separation of the water. Washing with hot alkali solution may also be used to remove the benzoic acid from the benzol vapors.

Example 2.

A mixture of benzoic acid and phthalic acid, as described in Example 1, but containing a considerable quantity of water, is heated to 95° C. and vapors of ether or carbon tetrachloride, or a mixture of the two, are passed through at approximately the temperature of the mixture. Benzoic acid is slowly sublimed over and but little water is carried with it. The vapors are then cooled sufficiently to precipitate out the bulk of the benzoic acid in dry form. The gases may then be condensed, or may be re-used without transformation into the liquid phase.

*Example 3.*

A mixture of benzoic and phthalic acids, such as described in Example 1, is treated by passing toluene vapors at a temperature of about 140–180° C. through the mixture to heat it up and maintain it at approximately 130°–170° C. The benzoic acid is sublimed off. The toluene vapors are cooled sufficiently to precipitate out benzoic acid, are then further heated and recirculated through the benzoic acid-phthalic acid mixture. The cooling of the vapors will not result in the condensation of all of the benzoic acid contained in them; small amounts will still remain in the vapor form, but as the vapors are recirculated through the benzoic acid-phthalic acid mixture, these small amounts of benzoic acid are not wasted, but are retained in the process. If desired of course the toluene vapors may be condensed and redistilled to recover further amounts of benzoic acid.

*Example 4.*

Phthalic anhydride vapors mixed with an excess of steam are passed over a catalyst which favors the splitting off of carboxyl groups, which catalyst is maintained at an elevated temperature and up to 90 per cent of the phthalic anhydride is usually transformed into benzoic acid and the mixed vapors of benzoic acid and phthalic anhydride and steam are then treated with vapors of benzol or carbon tetrachloride, or liquid benzol is sprayed into the gaseous stream so that the latter is cooled below 191° C. Phthalic acid together with some water condenses out and the benzoic acid also mixed with small amounts of steam passes on with the benzol or carbon tetrachloride vapors from which it can be condensed by cooling, the cooled vapors being then re-used.

*Example 5.*

Phthalic anhydride vapors are catalytically split in the presence of hydrogen in excess at an elevated temperature, producing a mixture of benzoic acid and phthalic anhydride together with some benzaldehyde in some cases containing benzyl alcohol and other reduction products. The vapors which are at an elevated temperature are contacted with low boiling solvent naphtha vapors which are sufficiently cooled to bring the temperature of the gaseous mixture below 191° C. Phthalic acid substantially precipitates out above the boiling point of the solvent naphtha. The vapors are then gradually cooled to effect a preliminary separation of the constituents by fractional condensation. On further cooling the solvent naphtha condenses, carrying down with it small amounts of the constituents, which can be readily separated by known methods, and the remaining gases consisting substantially of hydrogen, water vapor and of some carbon dioxide may be passed through cold water or alkalies to remove the water and carbon dioxide and the hydrogen re-used, or the concentration of carbon dioxide may be permitted to rise to a point where the gases mixed with hydrogen can be vented, and used for other purposes, such as for example the production of methanol and other organic compounds by catalysis.

*Example 6.*

A mixture of orthochlorbenzoic and the corresponding monochlorphthalic acid are heated to a temperature below that which chlorphthalic acid is transformed into the anhydride and gasoline or petroleum ether are passed through the mixture. Chlorbenzoic acid is sublimed over and substantially all of the chlorphthalic acid remains behind. The vapors may be condensed, and the chlorbenzoic acid separated, or they may be cooled sufficiently to condense out most of the chlorbenzoic acid and then reused.

Other substituted benzoic acids such as for example the polyhalogen acids or other substituted acids may be separated from the corresponding phthalic acids by the same means.

*Example 7.*

Phthalic anhydride vapors are mixed with steam and with a considerable excess of benzol or toluene vapors. The mixture is passed over a carbon dioxide splitting catalyst at an elevated temperature resulting in the transformation of phthalic anhydride into benzoic acid in yields up to 90% and over. The gaseous stream after leaving the converter is then cooled to a temperature below 191° C., which results in the transformation of the residual phthalic anhydride vapors into phthalic acid, which is nonvolatile and condenses out. The benzoic acid remains in the vapor form together with an excess steam and the vapors of the organic solvent from which gaseous stream it may be removed in any suitable manner. Instead of producing benzoic acid from phthalic anhydride and steam the phthalic anhydride and steam may be split in an atmosphere of a reducing gas, such as hydrogen resulting in the production of benzoic acid together with benzaldehyde and in some cases benzyl alcohol. The benzaldehyde and benzyl alcohol can be carried off by the gaseous stream after condensing out the phthalic acid and can be removed and separated from benzoic acid by any of the usual means.

What is claimed as new is:

1. A method of separating benzoic acids from phthalic acids, which comprises causing the mixture to contact with vapors of organic solvents for benzoic acid at temperatures not substantially above the temperature at which the phthalic acids are transformed into the anhydrides whereby the benzoic acids are sublimed off.

2. A method according to claim 1, in which the mixture is a mixture of benzoic acid and phthalic acid, and the treatment is carried on at a temperature below 191° C.

3. A continuous method of separating benzoic acids from phthalic acids, which comprises passing vapors of organic solvents for benzoic acids through a mixture of benzoic and phthalic acids at a temperature at which the benzoic acids are volatile, but below the temperature at which phthalic acids are transformed into the anhydrides, subjecting the vapors to conditions which favor the separation of benzoic acids therefrom and recirculating the vapors thus freed from benzoic acids after adjustment of temperature and composition through the benzoic acid-phthalic acid mixture.

4. A method according to claim 3, in which the organic solvent used has a sufficiently low boiling point as to permit substantial separation of water therefrom by cooling and the vapors after removal of benzoic acid are subjected to a temperature at which water vapor present is substantially removed without substantial liquefaction of the vapors.

5. A method of separating benzoic acids from phthalic acids in mixtures containing benzoic acids and phthalic acids, which comprises subjecting the effluent gases from a converter in which the phthalic anhydrides are catalytically split to benzoic acids, to contact with organic solvents at a temperature and in quantities sufficient to bring the temperature of the effluent gases below the point at which phthalic acids are transformed into the anhydrides whereby phthalic acids condense out and subsequently subjecting the vapors to treatment for removal of the benzoic acids contained therein.

6. A method of separating benzoic acids from phthalic acids in mixtures containing benzoic acids, phthalic acids and reduction products of benzoic acids, which comprises subjecting the effluent gases from a converter in which phthalic anhydrides are catalytically split to benzoic acids in the presence of a reducing gas to contact with organic solvents at a temperature and in quantities sufficient to bring the temperature of the effluent gases below the point at which phthalic acids are transformed into the anhydrides whereby the phthalic acids condense out and subsequently subjecting the vapors to treatment for removal of the benzoic acids contained therein.

Signed at Pittsburgh, Pennsylvania, this 14th day of October, 1927.

ALPHONS O. JAEGER.